United States Patent
Ducate, Jr.

(10) Patent No.: US 8,590,524 B2
(45) Date of Patent: Nov. 26, 2013

(54) TRASH RECEPTACLE HOLDER FOR OUTDOOR GRILL

(75) Inventor: John Ducate, Jr., Columbia, SC (US)

(73) Assignee: The Grill Company, LLC, Columbia, SC (US)

( * ) Notice: Subject to any disclaimer, the term of this patent is extended or adjusted under 35 U.S.C. 154(b) by 877 days.

(21) Appl. No.: 12/772,751

(22) Filed: May 3, 2010

(65) Prior Publication Data

US 2010/0275899 A1 Nov. 4, 2010

Related U.S. Application Data

(60) Provisional application No. 61/215,319, filed on May 4, 2009.

(51) Int. Cl.
*A47J 37/00* (2006.01)

(52) U.S. Cl.
USPC .......... 126/25 R; 220/737; 348/79; 312/321.5

(58) Field of Classification Search
USPC ....... 126/304 R; 220/737; 312/321.5; 248/79, 248/153, 907
See application file for complete search history.

(56) References Cited

U.S. PATENT DOCUMENTS

| | | | |
|---|---|---|---|
| 364,479 A | 6/1887 | Childs | |
| 2,247,232 A | 6/1941 | Goldberg | |
| RE26,140 E * | 1/1967 | Schoenike | 135/148 |
| 3,323,852 A | 6/1967 | Meyers | |
| 3,425,765 A | 2/1969 | Levy | |
| 3,922,046 A | 11/1975 | Schneider | |
| 4,881,706 A | 11/1989 | Sedlik | |
| 4,998,694 A | 3/1991 | Barteaux | |
| 5,474,374 A | 12/1995 | Sandvig | |
| 5,845,888 A * | 12/1998 | Anderson | 248/311.2 |
| 6,152,408 A | 11/2000 | O'Grady | |
| 6,427,960 B1 * | 8/2002 | Gehring et al. | 248/311.2 |
| 2003/0106547 A1 | 6/2003 | Stephen et al. | |
| 2006/0144385 A1 * | 7/2006 | Coleman et al. | 126/25 R |

OTHER PUBLICATIONS

Thermos Grill 2 Go II Advantage, URL, http://www.campingworld.com/shoping/item/Thermos-Grill-2-Go-II-Advantage/31182.
Built-In Condiment Holder of Luxor Outdoor Cooking Products, URL, http://www.americanheatingtechnologies,com/images/luxor-catalog.pdf.

* cited by examiner

*Primary Examiner* — Avinash Savani
(74) *Attorney, Agent, or Firm* — McNair Law Firm; Hunter Freeman (57) ABSTRACT

The invention generally relates to a trash receptacle holder for use on an outdoor grill that includes an upper retaining member capable of circumferentially receiving a trash receptacle; a lower retaining including a platform adapted to support a trash receptacle when said trash receptacle holder is in an erect position; an extension arm operatively connected to said upper and lower retaining members and allowing said upper and lower retaining members to be rotated into said collapsed position where said upper and lower retaining members are in a position that is generally perpendicular to the ground and an erect position where said upper lower retaining members are in a position that is generally parallel to the ground and a trash receptacle may be placed on said lower retaining member and circumferentially received by said upper retaining member.

19 Claims, 6 Drawing Sheets

TRASH RECEPTACLE HOLDER FOR OUTDOOR GRILL

CROSS REFERENCE

This application claims priority from provisional application No. 61/215,319 that was filed on May 4, 2009 and has the same title as the present application.

BACKGROUND OF THE INVENTION

When cooking outdoors, it is often advantageous to have a trash receptacle for disposing of garbage and other refuse. It is also advantageous to have the trash receptacle out of sight and portable. Therefore, it would be advantageous to provide a trash receptacle that is disposed within the housing of the outdoor grill.

Because the interior space defined by the grill housing is small and typically contains the fuel tank, it is advantageous to provide a trash receptacle holder that is collapsible so that when not in use, the receptacle may be placed in a compact, collapsed position.

Therefore, it is an object of this invention to provide a trash receptacle holder that allows the placement of a removable trash receptacle when the holder is disposed in the interior of the outdoor grill housing.

The invention will be more readily understood from a reading of the following specification and by reference to the accompanying drawings forming a part thereof, wherein an example of the invention is shown and wherein.

DETAILED DESCRIPTION OF THE INVENTION

Referring now in more detail to the drawings, the invention will now be described in more detail.

Figure 1:
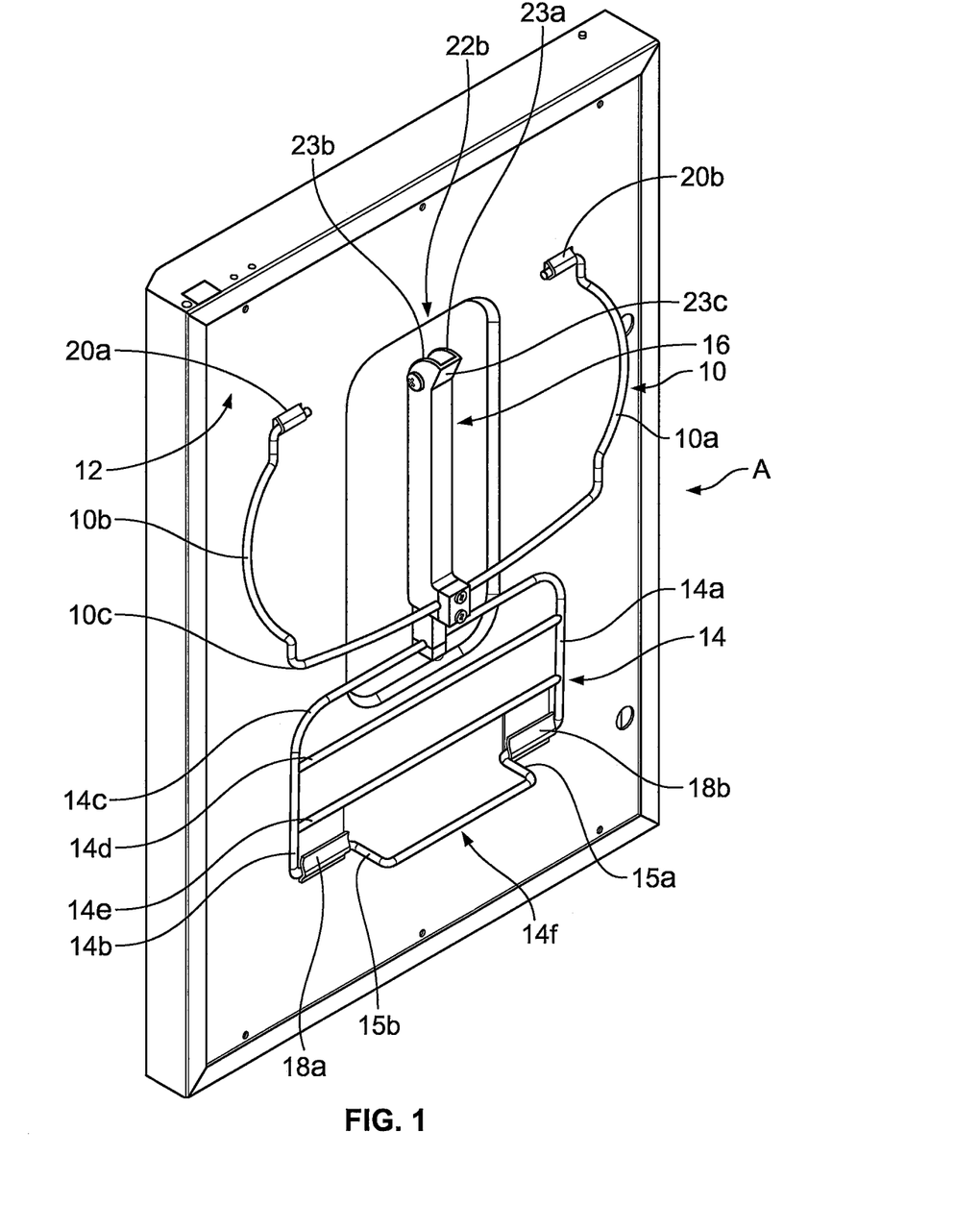
FIG. 1 is a perspective view of the invention in its collapsed position.

Referring now to FIG. 1, the invention is generally shown as A. The invention comprises an upper retaining member 10 that is pivotally connected to the interior of a grill door, generally shown as 12. The invention also includes a base retaining member 14 that is pivotally connected to the interior of a grill door and an extension arm, generally shown as 16 that pivotally interconnects the upper retaining member 10 and the base retaining member 14.

In one embodiment, base 14 includes two substantially identical and opposing side frames 14a and 14b that are interconnected by a plurality of cross bars 14c, d and e. These side frames and cross bars provide the base retaining member 14 a generally rectangular shape adapted to receive the bottom of a paper bag. When the trash receptacle holder is in the fully erect position, the base retaining member supports the weight of the bag and any refuse in the bag and therefore, acts as a support member. The base retaining member also includes a rear frame 14f that is pivotally connected to the grill door 12 by means of two fasteners 18a and b. Rear frame 14f is pivotally connected to the grill door 12 and is generally positioned parallel to cross bars 14c-e. However, two sections of rear frame 15a&b are positioned substantially perpendicular to cross bars 14c-e to provide horizontal spacing between cross bars 14c-e and rear frame 14f when the receptacle holder is in a collapsed position. As will be discussed more fully below, the horizontal spacing of rear frame allows rear frame to act as a stop that prevents base retaining member 14 to rotate more than 90 degrees with respect to the interior of the grill door when the receptacle holder is placed in an erect position.

Cross bar 14c is pivotally connected to a first end of the extension arm 16, which interconnects the base retaining member 14 with the upper retaining member 10. The upper retaining member is pivotally connected to the door via two fasteners 20a and b and is also pivotally connected to an upper end of the extension arm 16. The upper retaining member has a first side retaining member 10a and a second side retaining member 10b opposing the first side retaining member. The upper retaining member also has a front side retaining member 10c interconnecting both side retaining members 10a&b. These retaining members give the upper retaining member 10 a shape generally adapted to receive and enclose the circumference of a paper bag.

As can be seen in FIG. 1, when in the fully collapsed position, the extension arm 16 lays substantially flat against the interior of the grill door 12, which in turn causes the upper retaining member 10 and the lower retaining member to lay substantially flat against the interior of the door. This collapsed configuration allows the receptacle holder to fold up into a very compact area so as to leave as much of the storage space in the interior of the grill housing available for other items when the receptacle holder is not in use.

Figure 2:
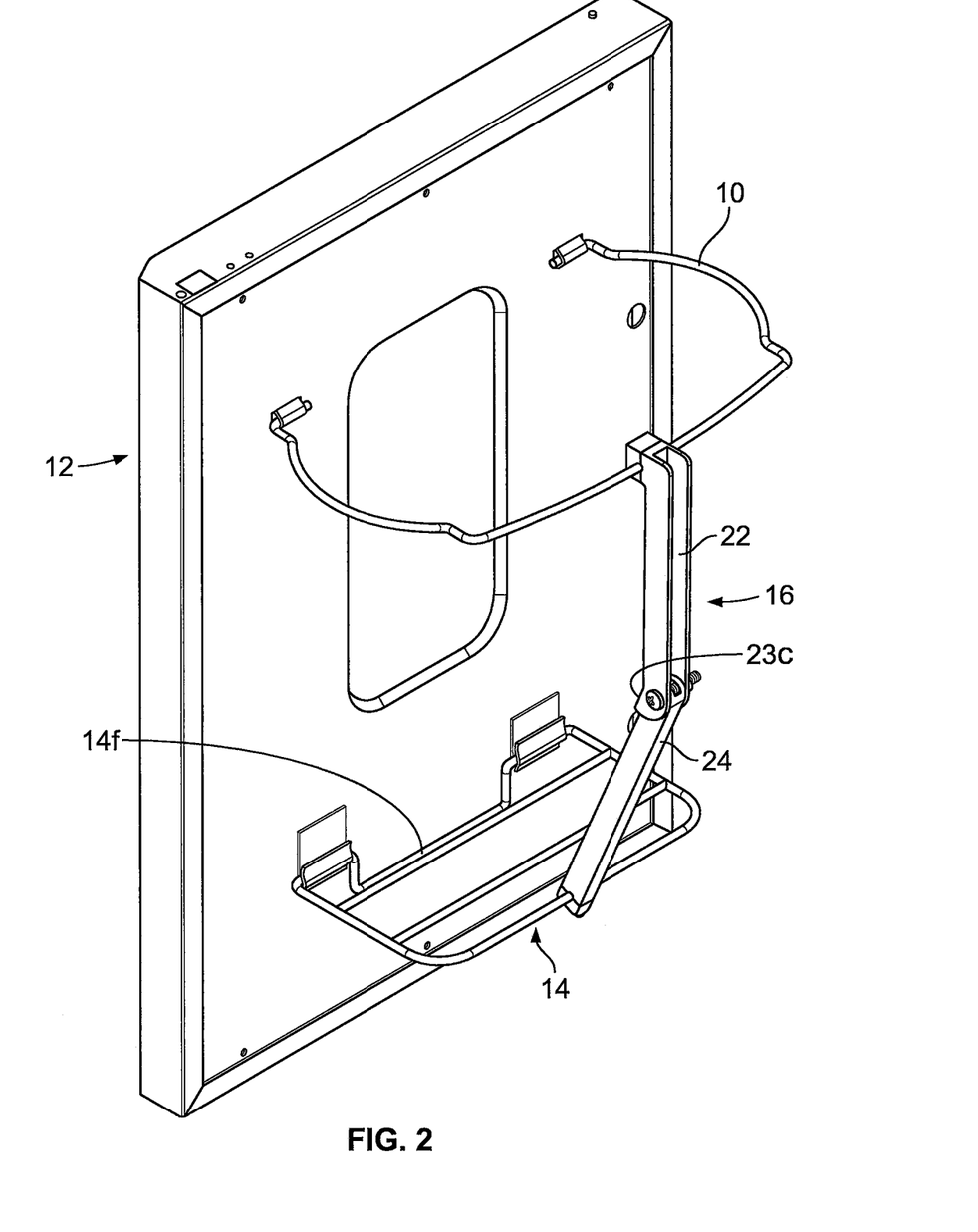
FIG. 2 is a perspective view of the invention in its fully erected position.

As can be seen in FIG. 2, the extension arm, generally shown as 16, comprises a first arm, generally shown as 22, that is pivotally connected to a second arm, generally shown as 24. When in the fully erect position, the trash bag receptacle holder provides a sturdy base, generally shown as 14, that is capable of carrying a substantial amount of weight due to the contact between the door, generally shown as 12, and the rear frame 14f of the base retention member. This contact prevents the base retention member 14 from rotating past a position that is generally perpendicular to the door when in the fully erect position. Similarly, the lower extension arm 24 and the upper extension arm 22 vertically support the upper retaining member 10 to maintain it in a generally perpendicular position to the door. When in the fully erect position, the two extension arms 22 and 24 act as a frontal retention bar, keeping the trash bag from bulging through the front of the space between the upper and lower retaining members.

The bottom retaining member 14 has a generally rectangular shape to support the bottom of a typical paper bag and the upper retaining member has a shape that is adapted to circumferentially receive the paper bag. Therefore, when the paper bag is lowered into the upper retaining member until the bottom of the bag comes in contact with the lower retaining member 14, the invention provides a bottom support by means of the bottom retaining member 14, side supports by way of the upper retaining member 10 which encloses the circumference of the upper portion of the paper bag and a front support which is created by the upper extension arm 22 and the lower extension arm 24.

Figure 3A:
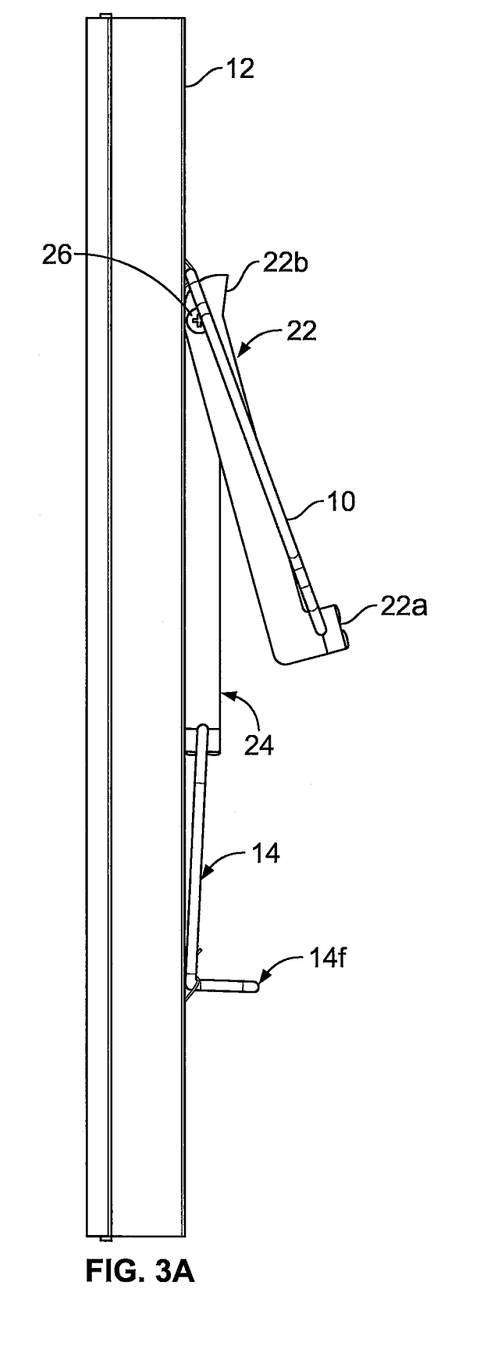
FIG. 3A is a side planer view of the invention being placed into an erected position.

Referring now to FIGS. 3A-D, the process by which the trash receptacle is placed into a fully erect position is shown. In FIG. 3A, the unfolding of the extension arm can be more clearly seen. A first distal end 22a of the upper extension arm 22 is pivotally connected to the upper retaining member 10 and a second distal end 22b is pivotally connected to the lower extension arm 24. The trash receptacle can be placed in a fully erect position by rotating the first distal end 22a of the upper extension arm upwardly from a position that is substantially parallel to the grill door 12 to a position that is generally perpendicular to the grill door. As first distal end 22a is rotated, the second distal end 22b pivots about the connection point 26 with extension arm 24. The rounded shape of second distal end 22b allows the second end to guide the rotation so that the upper extension arm 22 can be rotated easily. As will be discussed more fully below, the shape of the second distal end also facilitates the collapsing the receptacle by ensuring smooth and proper rotation of the second distal end 22b.

Figure 3B:
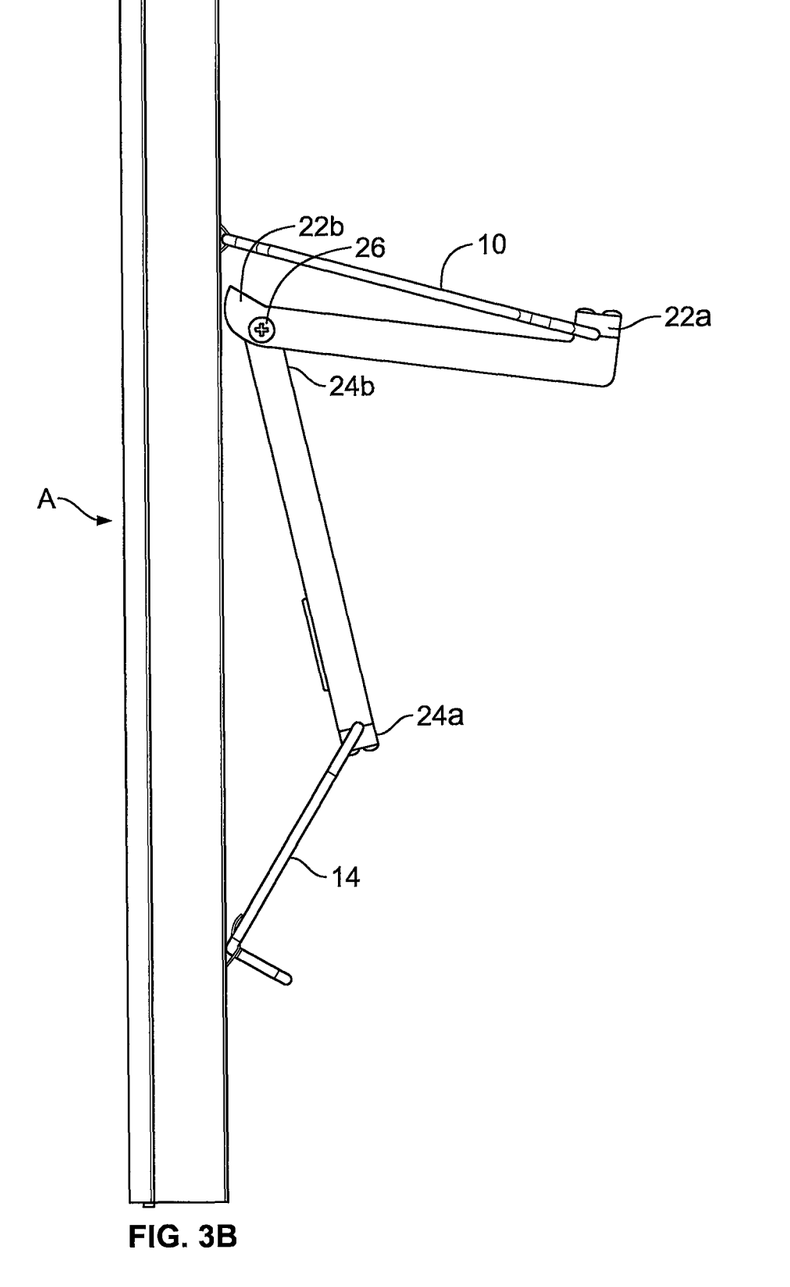
FIG. 3B is a side planer view of the invention being placed into an erected position.

Referring now to FIG. 3B, the first distal end 22a of the upper extension arm is rotated about the pivotal joint 26 connecting the upper extension arm 22 and lower extension arm 24, which causes the second distal end 22b to rotate about the pivotal connection 26. The curved nature of the second distal end 22b facilitates the rotation of the upper extension arm 22 and causes the first distal end of the lower extension arm 24a to move away from the interior surface of the grill door 12. The movement of the first distal end 24a of the lower extension arm causes the lower retaining member 14 to rotate in a clockwise direction about the pivotal fastener (shown in FIG. 1 as 18a). Similarly, as the first distal end of the upper extension arm 22a is rotated about the pivotal joint 26, the upper retaining member 10 is caused to rotate in a counter-clockwise direction about the fastener 20a. The more that the first distal end 22a is rotated about the pivotal joint 26, the further the first distal end 24a of the lower extension arm is distanced from the interior of the door 12 and the further the upper retaining member 10 and base retaining member 14 rotate with respect to the interior of the grill door 12.

Figure 3C:
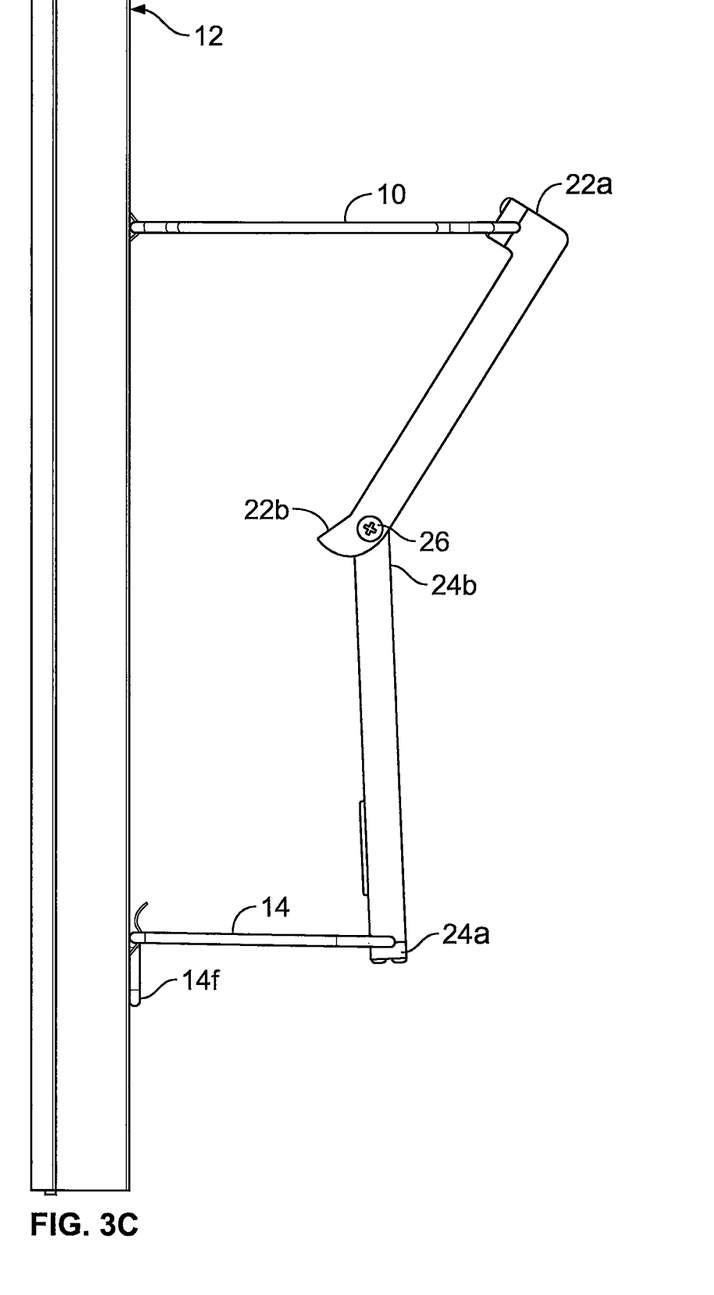
FIG. 3C is a side planer view of the invention being placed into an erected position.

As can be seen in FIG. 3C, the upper extension arm 22 continues to be rotated in a counter clockwise direction, causing the lower extension arm 24 to continually rotate in a clockwise direction. The first distal end 22a of the upper extension arm is rotated until both retaining members 10 and 14 are placed in a generally perpendicular relation to the interior of the door 12. The contact between rear frame 14f and the interior door 12 causes the base retaining member 14 to maintain its generally perpendicular position with respect to the interior of the door 12 as is shown in FIG. 10. The ends of the extension arms 22b and 24b continue to rotate about the joint 26 until the receptacle reaches the fully erect position shown in FIG. 3D. Once the receptacle reaches the fully erect position, the extension arms cease to rotate and maintain their extended position.

As can be seen more clearly in FIG. 1, the upper extension arm 22 is adapted to receive and enclose the lower extension arm when the apparatus is placed in a collapsed position. As discussed above the curved nature of the second distal end 22b facilitates the rotation of the extension arms 22 and 24. However, the curved nature of the second distal end also determines the angle between the upper extension arm 22 and lower extension arm when the receptacle is placed in the fully erect position. As can be seen in FIG. 1, the second distal end generally shown as 22b, has a first curved side 23a, a second opposing and substantially identical curved side 23b and an angled top 23c interconnecting the two sides. As with the entire upper extension arm 22, there is no base interconnecting the two opposing sides, allowing the upper extension arm to receive and enclose the lower extension arm 24 when in a collapsed position.

Figure 3D:
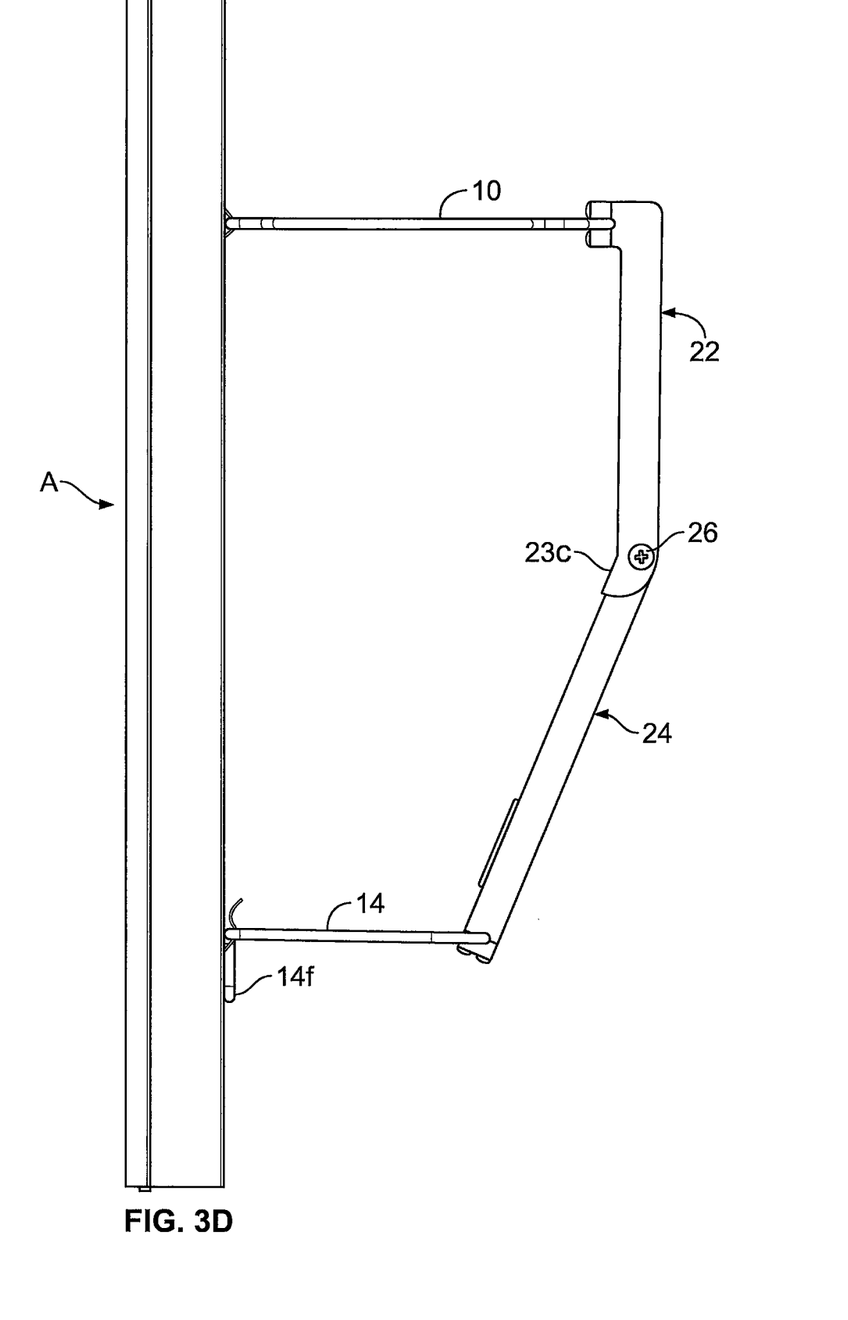
FIG. 3D is a side planer view of the invention being placed into an erected position.

As can be seen in FIGS. 2 and 3D, when placed in a fully erect position, the angled top acts as a block and only allows the extension arms to rotate into an angled position with respect to one another that has an angle that is the same as the angled between the angled top 23c and the remainder of the extension arm 22, thus maintaining the fully erect position. If the angled top were not included, the extension arms would be free to rotate nearly 360 degrees with respect to one another and the erect position could not be maintained.

In alternate embodiments, the erect position may be maintained by a number of different locking mechanisms or a combination thereof. For example, the extended position may be maintained by the use of a pivotal hinge 26 having a locking mechanism that prevents the extension arms 22 and 24 from rotating past the fully erect position shown in FIG. 3D. In other embodiments, there may be a locking mechanism included in the joint connecting the first distal end 22a of the upper extension arm and the upper retaining member 10 preventing over rotation of the upper extension arm past the fully erect position. Similarly, the joint interconnecting the distal end 24a of the lower extension arm and the base retaining member 14 may include a locking mechanism that prevents rotation of the lower extension arm past the fully erect position shown in FIG. 12. In alternate embodiments there may be a combination of locking mechanisms for maintaining the erect position. These locking mechanisms would likely be used only if the upper extension arm 22 did not include the angled top 23c to maintain the fully erect position.

Further, it should be noted that the invention could be constructed so as to be integrally connected to the outdoor grill or could be constructed so that it could be attached to an outdoor grill as an aftermarket product. In this alternate embodiment where the invention could be attached to the outdoor grill, the connection means 20a&B and 18a&b would not be welded or integrally attached to the outdoor grill but instead would be secured by means known in the art such as a screw, adhesive, solder or the like. In either embodiment, the invention would work as described above.

While a preferred embodiment of the invention has been described using specific terms, such description is for illustrative purposes only, and it is to be understood that changes and variations may be made without departing from the spirit or scope of the following claims.

What is claimed is:

1. An outdoor grill having a trash receptacle holder comprising:
   an outdoor grill having a storage compartment door;
   an upper retaining member having a first side arm and a second side arm opposing said first side arm and a front arm interconnecting said first and said second side arms, wherein said first and said second side arms are pivotally connected to said door;
   a lower retaining member including a platform adapted to support a trash receptacle and having a rear base arm that is pivotally connected to said door and is spaced in a generally perpendicular direction from said platform so that when said trash receptacle holder is in an erect position said rear base arm is vertically spaced from said platform and contacts said door thereby maintaining said platform in a perpendicular position with respect to said door when said trash receptacle holder is in said erect position;
   an extension arm having an upper extension arm pivotally connected to a lower extension arm, wherein said extension arm is pivotally connected to both of said upper and lower retaining members;
   whereby said trash receptacle holder is placed in said erect position when one of said upper extension arm and said lower extension arm is rotated thus placing said upper retaining member and said platform in a position that is generally perpendicular to said door, wherein a trash receptacle may be placed on said platform and circumferentially received by said upper retaining member.

2. The trash receptacle holder of claim 1 wherein said upper extension arm has a lower distal end pivotally connected to an upper distal end of said lower extension arm, wherein said upper extension arm includes a first interior channel generally disposed at said lower distal end and defined by an angled top interconnecting two opposing side walls so that when said trash receptacle holder is in said erected position, said angled top contacts said upper distal end of said lower extension arm and said interior channel receives said upper distal end, thus allowing said upper and lower extension arms to rotate past 180 degrees and into said erect position.

3. The trash receptacle holder of claim 2 wherein said two opposing side walls have a radiused edge that contacts said door so that the friction between said door and said radiused edge is reduced when said upper extension arm is rotated to place said trash receptacle holder in one of said erect position and said collapsed position.

4. The trash receptacle holder of claim 1 wherein said upper extension arm includes a second interior channel disposed generally along the length of said upper extension arm and defined by a top wall interconnecting two opposing side walls and adapted to receive said lower extension arm when said trash receptacle holder is in said collapsed position.

5. The trash receptacle holder of claim 1 wherein said platform includes a front support arm interconnecting two opposing side support arms and a cross bar extending between said two opposing side support arms.

6. The trash receptacle holder of claim 5 wherein the horizontal spacing between said door and said front arm of said upper retaining member is greater than the horizontal spacing between said door and said front support arm of said platform when said trash receptacle is placed in said erect position.

7. A trash receptacle holder for use on an outdoor grill comprising:
an upper retaining member capable of being pivotally connected to an outdoor grill and having a front arm interconnecting a first side arm and a second side arm opposing said first side arm;
a lower retaining member capable of being pivotally connected to an outdoor grill and including a platform adapted to support a trash receptacle when said trash receptacle holder is in an erect position and further including a rear base arm that is capable of being pivotally connected to an outdoor grill and is spaced in a generally perpendicular direction from said platform so that said rear base arm is vertically spaced from said platform when said trash receptacle holder is in said erect position and horizontally spaced from said platform when said trash receptacle holder is in a collapsed position;
an extension arm having an upper extension arm pivotally connected to a lower extension arm, wherein said extension arm is operatively connected to said upper and lower retaining members thus allowing said upper and lower retaining members to be rotated into said collapsed position and said erect position;
whereby said trash receptacle holder is in said collapsed position when one of said upper extension arm and said lower extension arm is rotated thus placing said upper retaining member and said platform in a position that is generally perpendicular to the ground and said trash receptacle holder is in said erect position when one of said upper extension arm and said lower extension arm is rotated thus placing said upper retaining member and said platform in a position that is generally parallel to the ground so that a trash receptacle may be placed on said platform and circumferentially received by said upper retaining member.

8. The trash receptacle holder of claim 7 wherein said upper extension arm has a lower distal end pivotally connected to an upper distal end of said lower extension arm, wherein said upper extension arm includes a first interior channel generally disposed at said lower distal end and defined by an angled top interconnecting two opposing side walls so that when said trash receptacle holder is in said erected position, said angled top contacts said upper distal end of said lower extension arm and said interior channel receives said upper distal end, thus allowing said upper and lower extension arms to rotate past 180 degrees and into said erect position.

9. The trash receptacle holder of claim 8 wherein said two opposing side walls have a radiused edge for contacting the outdoor grill so that the friction between the outdoor grill and said radiused edge is reduced when said upper extension arm is rotated to place said trash receptacle holder in one of said erect position and said collapsed position.

10. The trash receptacle holder of claim 7 wherein said upper extension arm includes a second interior channel disposed generally along the length of said upper extension arm and defined by a top wall interconnecting two opposing side walls and adapted to receive said lower extension arm when said trash receptacle holder is in said collapsed position.

11. The trash receptacle holder of claim 7 wherein said platform includes a front support arm interconnecting two opposing side support arms and a cross bar extending between said two opposing side support arms.

12. The trash receptacle holder of claim 11 wherein the length of said first and said second side arm of said upper retaining member is greater than the length of said two opposing side support arms of said lower retaining member.

13. A trash receptacle holder for use on an outdoor grill comprising:
an upper retaining member adapted to circumferentially receive a trash receptacle and a proximal end capable of being pivotally connected to an outdoor grill;
a lower retaining member having a proximal end capable of being pivotally connected to an outdoor grill and adapted to support a trash receptacle when said trash receptacle holder is in an erect position;
an extension arm having an upper extension arm pivotally connected to a lower extension arm, wherein said extension arm is operatively connected generally adjacent to a distal end of said upper and lower retaining members thus allowing said upper and lower retaining members to be rotated from a collapsed position into said erect position;
whereby said trash receptacle holder is in said collapsed position when one of said upper extension arm and said lower extension arm is rotated thus placing said upper retaining member and said lower retaining member in a position that is generally perpendicular to the ground and said trash receptacle holder is in said erect position when one of said upper extension arm and said lower extension arm is rotated thus placing said upper retaining member and said lower retaining member in a position that is generally parallel to the ground so that a trash receptacle may be placed on said lower retaining member and circumferentially received by said upper retaining member.

14. The trash receptacle holder of claim 13 wherein said upper extension arm has a lower distal end pivotally connected to an upper distal end of said lower extension arm, wherein said upper extension arm includes a first interior channel generally disposed at said lower distal end and defined by an angled top interconnecting two opposing side walls so that when said trash receptacle holder is in said erected position, said angled top contacts said upper distal end of said lower extension arm and said interior channel receives said upper distal end, thus allowing said upper and lower extension arms to rotate past 180 degrees and into said erect position.

15. The trash receptacle holder of claim 14 wherein said two opposing side walls have a radiused edge for contacting the outdoor grill so that the friction between the outdoor grill and said two opposing side walls is reduced when said upper extension arm is rotated to place said trash receptacle holder in one of said erect position and said collapsed position.

16. The trash receptacle holder of claim 13 wherein said upper extension arm includes a second interior channel disposed generally along the length of said upper extension arm and defined by a top wall interconnecting two opposing side walls and adapted to receive said lower extension arm when said trash receptacle holder is in a collapsed position.

17. The trash receptacle holder of claim 13 wherein said lower retaining member further includes a platform adapted to support a trash receptacle when said trash receptacle holder is in an erect position and a rear base arm that is spaced in a generally perpendicular direction from said platform so that said rear base arm is vertically spaced from said platform when said trash receptacle holder is in said erect position and horizontally spaced from said platform when said trash receptacle holder is in a collapsed position.

18. The trash receptacle holder of claim 13 wherein said lower retaining member includes a front support arm interconnecting two opposing side support arms and a cross bar extending between said two opposing side support arms.

19. The trash receptacle holder of claim 18 wherein the length of said front arm of said upper retaining member is greater than the length of said two opposing side support arms of said lower retaining member.

* * * * *